Oct. 15, 1946.  C. V. GREENLEAF  2,409,430

FLOW INDICATOR FOR PIPE LINES

Filed May 1, 1944  2 Sheets-Sheet 1

Inventor
CARROLL V. GREENLEAF,

By Clarence A. O'Brien
and Harvey B. Jacobson
Attorneys

Oct. 15, 1946.  C. V. GREENLEAF  2,409,430
FLOW INDICATOR FOR PIPE LINES
Filed May 1, 1944   2 Sheets-Sheet 2

Inventor
CARROLL V. GREENLEAF,
By Clarence A. O'Brien
and Harvey B. Jacobson
Attorneys Patented Oct. 15, 1946

2,409,430

UNITED STATES PATENT OFFICE 2,409,430

FLOW INDICATOR FOR PIPE LINES

Carroll V. Greenleaf, Edmonds, Wash.

Application May 1, 1944, Serial No. 533,628

1 Claim. (Cl. 138—76)

My invention relates to improvements in flow indicators for oil pipe lines, more particularly, the principal object in view being to provide a simply constructed, inexpensive, efficient device to be interposed in an oil pipe line and which is adapted to render the stream flowing through the line clearly visible and is equipped with means for indicating positively whether or not the oil is flowing.

Other, and subordinate, objects are also comprehended by my invention, all of which, together with the precise nature of my improvements, will be readily understood when the succeeding description and claims are read with reference to the drawings accompanying and forming part of this specification.

Figure 1:
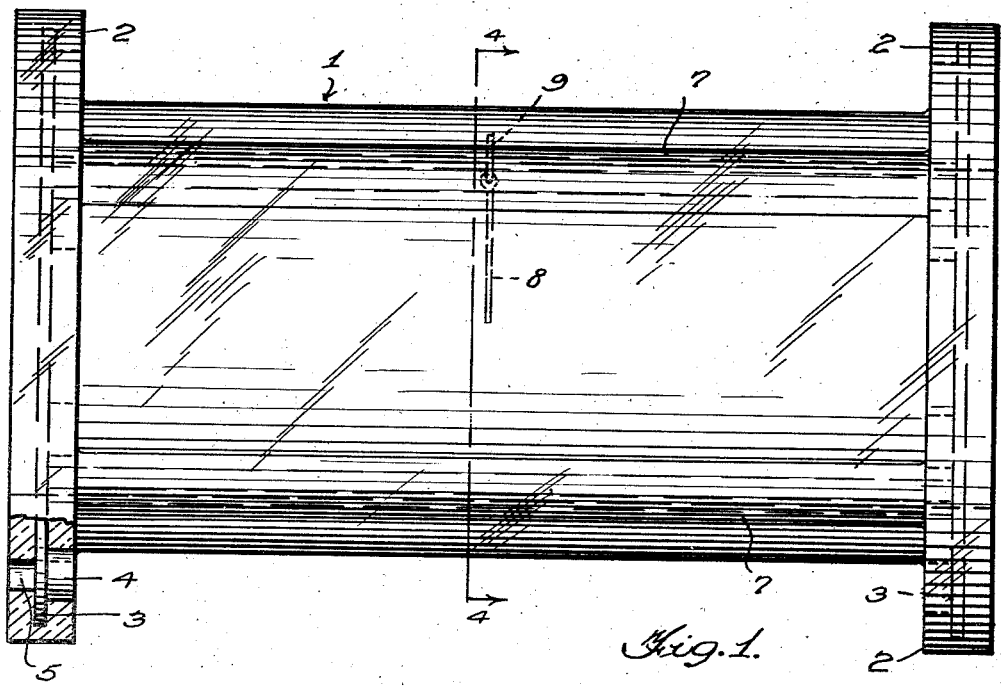
Figure 2:
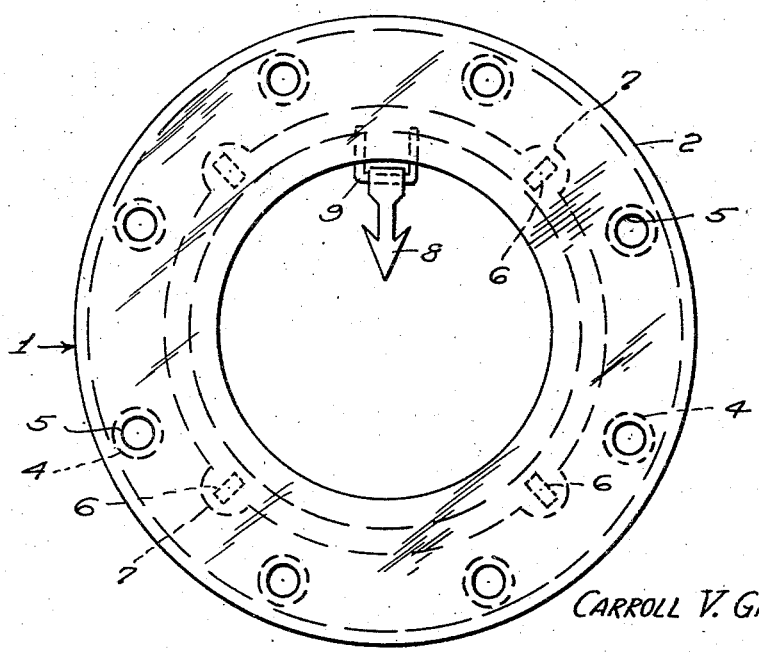
Figure 3:
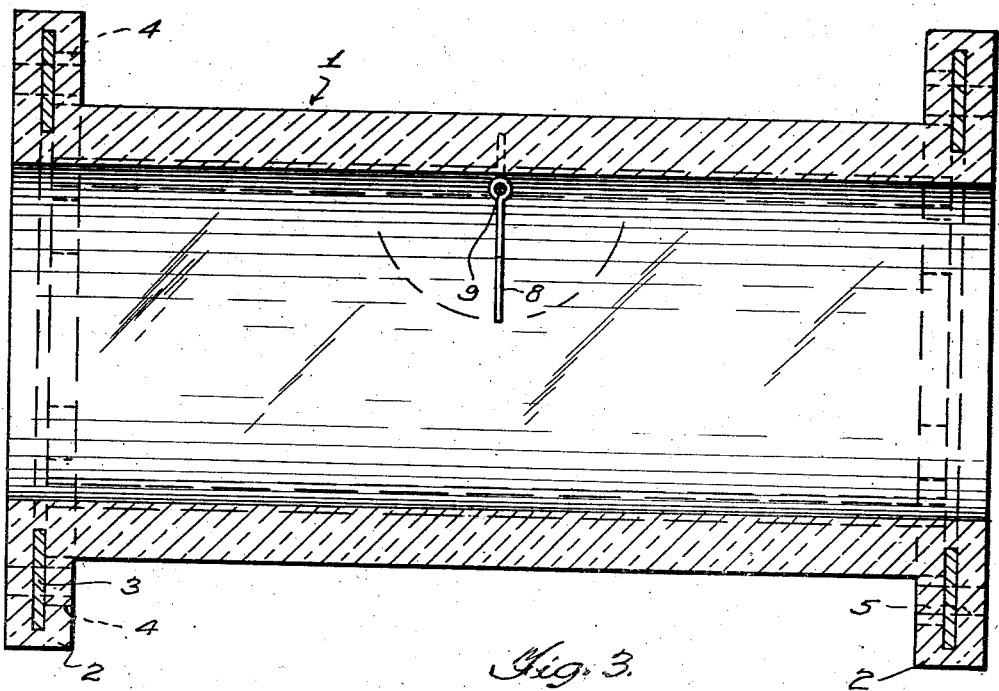
Figures 4, 5:
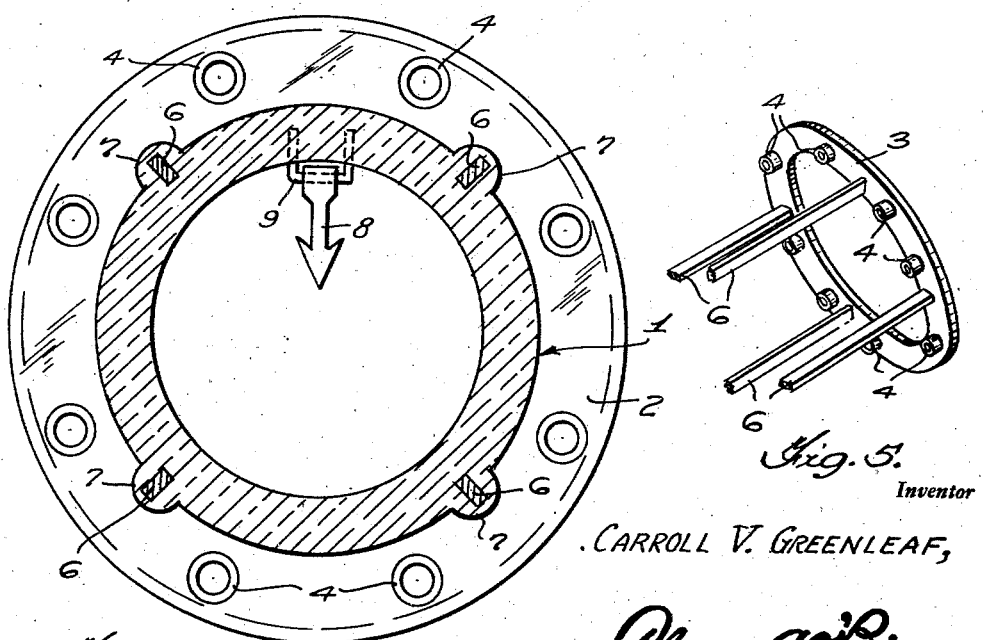

In said drawings:

Figure 1 is a view in side elevation of my invention in its preferred embodiment, Figure 2 is a view in end elevation, Figure 3 is a view in longitudinal vertical section, Figure 4 is a view in transverse section taken on the line 4—4 of Figure 1, Figure 5 is a fragmentary view in perspective of the bonding devices.

Referring to the drawings by numerals, my improved flow indicator comprises a pipe section 1 of any suitable length and diameter and which is provided with a pair of circumferential, radial external end flanges 2. The pipe section 1 is formed of a suitable transparent plastic which is a non-conductor of electricity.

A pair of flat rings 3 are embedded in the flanges 2 and the body of the pipe section 1 each in a common plane with the flange and are provided with a plurality of circumferentially and equidistantly spaced tubular bosses 4 on one side thereof extending through the flanges and terminating flush with the inner faces of said flanges. On the other sides of said rings 3, the flanges are provided with bolt holes 5 aligned with the bosses 4.

A plurality of flat bars 6 of metal suitable for conducting electricity extend longitudinally of the body of the pipe section 1 and are connected at their ends to the rings 3, said bars being grouped around the section 1 in equidistantly spaced relation and embedded in the body of said section and longitudinal external ribs 7 extending between the flanges 2.

In what constitutes the top of the pipe section 1, and in the transverse center thereof, an arrow-like flow indicator member 8 is suspended by a staple-like hanger 9 embedded in the body of the pipe section 1, said member 8 being swingably mounted on the hanger 9 for movement longitudinally of said pipe section.

The described flow indicator is designed to be interposed in a pipe line, particularly an oil discharge pipe line of a tanker, or the like, by bolting the same through the bosses 4 and bolt holes 5 to the end flanges of the usual pipe line sections, not shown. When thus installed, the stream of oil pumped through such a discharge line is clearly visible through the pipe section 1 so that it is possible to see the color of the product being pumped, particularly in the case of different gasolines, and prevent mixtures occurring in unloading oil, or gasoline. Also, whether or not the pipe line is full, or only partially so, or empty, may be readily ascertained. The flow indicator member 8, under the flow of oil, or gasoline, through the pipe section 1 will be swung in the direction of the flow to positively indicate that the contents of the pipe line are flowing therethrough, and in the event that such is not the case, said member will assume a perpendicular position and thereby indicate that the contents of the pipe line are not being pumped therethrough. When gasoline is being pumped through a pipe line equipped with my improved flow indicator, the accumulation of static electricity in the indicator is obviated, since the rings 3 connected by the bars 6 are bonded to the pipe sections, not shown, between which the flow indicator is interposed through the before-mentioned bolts which are bonded with the bosses 4, as will be clear.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

A device of the class described to be interposed between sections of a pipe line comprising a pipe section of transparent insulating plastic provided with circumferential end flanges having bolt holes therein for bolting in the line, and means embedded in said section for obviating the accumulation of static electricity in the section and constructed and arranged for bonding with said line through said bolts comprising a pair of conductor rings embedded in said flanges and provided with tubular bosses aligned with said bolt holes and adapted for the extension of said bolts therethrough, and longitudinal conductor bars embedded in said section and connecting said rings.

CARROLL V. GREENLEAF.